July 11, 1967
D. R. HART ETAL
3,330,012
SCREW-TYPE PIN RETAINER
Filed June 28, 1965
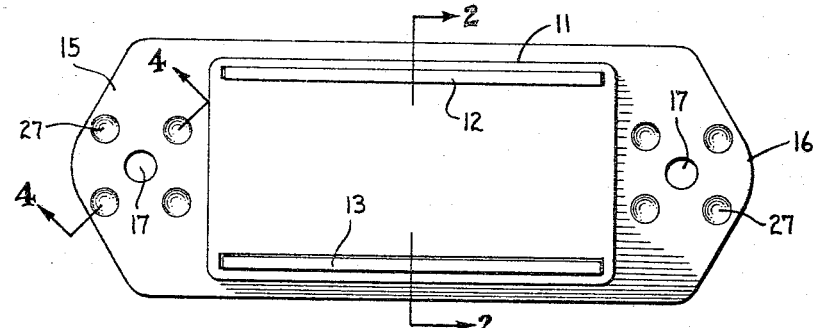
Fig. 1.
Fig. 3.
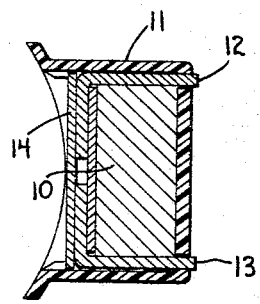
Fig. 2.
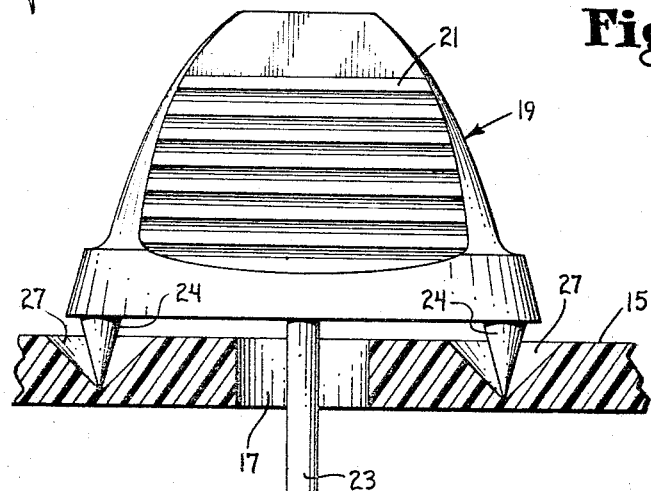
Fig. 4.
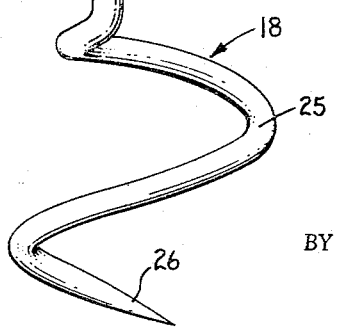
INVENTORS.
DON REX HART and
WILLARD L. PADGETT
BY
Herbert A. Minturn
Attorney

United States Patent Office 3,330,012
Patented July 11, 1967

3,330,012
SCREW-TYPE PIN RETAINER
Don Rex Hart, Rte. 1, and Willard L. Padgett, Rte. 2, both of Worthington, Ind. 47471
Filed June 28, 1965, Ser. No. 467,502
2 Claims. (Cl. 24—150)

This invention relates to means for holding a screw-type pin in a selected non-rotative position for retaining a device in position on a fabric or surface of upholstered members, such for example, on an automobile seat back, where the device would be a magnet for holding a seat belt buckle part, when not in use, up off the floor or from falling out the automobile door when opened. The invention primarily relates to means preventing the pin from unwarranted backing out from the upholstery.

A primary object in general of the invention is to provide an extremely simple structure for the purpose above indicated, quite simple, and requiring no buckles or other movable means after the structure is positioned for use, to hold the seat buckle up out of the way in full sight suggesting by its presence that the seat belt should be used.

We are aware of the fact the screw-type pins have long been used to support objects. Our invention relates to means of preventing loosening of the pin in retaining a magnet after the pin has been engaged with the supporting material. Otherwise, the screw-type pin has a tendency to back out of the material under pull of the belt buckle part from the holding magnet.

One particular form of structure embodying the invention is illustrated in the accompanying drawing, in which FIG. 1 is a view in top plan of a magnet structure embodying the invention, the structure being shown without the pin applied thereto;

FIG. 2 is a view in transverse section on the line 2—2 in FIG. 1;

FIG. 3 is a view in perspective of a headed pin from the underside of the head; and FIG. 4 is a view on a greatly enlarged scale in section on the line 4—4 in FIG. 1 with the pin applied.

The buckle holding structure comprises magnet means 10 carried primarily within a box 11 with two pole pieces 12 and 13 exposed from the top of the box 11. The magnet is retained in the box 11 by a floor 14.

The box 11 has end portions 15 and 16, through each of which is a hole 17 to receive a screw-pin 18 therethrough. A head generally designated by the numeral 19 is fixed to an outer, shank end portion 20 of the pin 18. The head 19 is shaped to have an outer thumb and forefinger gripping portion 21 as means for rotating the pin 18. The underside of the pin 18 in the present form has a flat surface 22, centrally from which a portion of the shank 23 extends. Around the shank 23, there are a plurality of retaining rigid fingers 24, herein shown as four in number circumferentially spaced equal distances apart, extending from the face 22. Where the head 19 is made out of a plastic, these fingers may be integral with the head. Preferably the fingers 24 are pointed.

The pin 18 has a spiralled, cork-screw portion 25 extending from the shank 23 through at least one complete revolution, and terminating in a sharply pointed end 26. The box ends 15 and 16, each carry on their top sides a number of inverted conical sockets 27, shown as four in number, spaced equally apart circumferentially of the hole 17, the radial spacing of these sockets 27 from the center of the hole 17 being equal to the radial spacing of the fingers 24 from the pin shank 23.

Operation

The pin 18 is rotatingly inserted through the hole 17 in each instance. The pin 18 is rotated by turning the head 19 to cause the pointed end 26 to engage and penetrate the upholstery (not shown), drawing the box 11 snugly thereagainst.

In this rotation of the pin 18, the box 11 may be pressed forcibly against the upholstery which is generally elastic in nature. When the fingers 24 come into contact with the ends 15 and 16, the fingers will enter the sockets 27 and pin rotation may be stopped and the box 11 released to allow the upholstery to spring back the ends 15 and 16 so as to retain the fingers 24 firmly in the sockets 27. If not enough pressure between the sockets and the fingers is had, the pin 18 may be farther rotated and in so doing the hold of the spiral 25 in the upholstery will be sufficient to allow the box 11 to be pressed against the upholstery to allow the fingers 24 to ride up the inclined sides of the sockets 27 and thus permit the fingers 24 to be rotated with the head 19 into subsequently encountered sockets 27.

With the magnet box 11 thus anchored in place, it is then ready to have a ferrous article placed thereagainst as a means of holding the article, such as the seat belt buckle up out of the way, ready for quick removal for use. The box 11 is held against swinging by reason of the use of the two, spaced apart screw-pins 18.

While we have herein shown and described our invention in the form now best known to us, it is obvious that structural changes may be made in that form without departing from the spirit of the invention, such as using a cam-like surface on both the body and the head underside, and we therefore do not desire to be limited to that precise form beyond the limitations which may be imposed by the following claims.

We claim:
1. Structure for holding a screw-type pin in resilient material, such as upholstery, against loosening rotation while supporting a body, comprising
   a screw pin having a straight shank portion from which leads a spiral length portion terminating in a sharp point;
   a manipulating head fixed on said shank;
   a body having a surface with a hole through which said pin passes and in which hole said shank is rotatable;
   said manipulating head on said pin shank having a side directed toward a zone of said surface surrounding said hole; and
   said head side and said body surface having opposing cam-like surfaces selectively engaging one another upon rotation of the head as means for retaining said pin against rotation when screwed into said material.
2. Structure for holding a screw-type pin in resilient material such as upholstery against loosening rotation while supporting a body, comprising
   a screw pin having a straight shank portion from which leads a spiral length portion terminating in a sharp point;
   a manipulating head fixed on said shank;
   at least one finger carried by said head, directed longitudinally of the pin shank;

a body having a surface through which said pin passes and in which said shank is rotatable;

said body surface carrying at least one finger receiving socket;

said finger entering said socket upon turning of said pin by said head and said pin spiral length entering and traveling its length into said material and said socket reception of said finger preventing reverse turning of the pin;

said finger being conically shaped; and said socket has an inclined wall permitting said finger to be retracted from said socket upon forcible turning of said head in either direction of rotation.

References Cited

UNITED STATES PATENTS

| 222,124 | 12/1879 | Boyd | 24—105 |
|---|---|---|---|
| 334,170 | 1/1886 | Hellmuth. | |
| 1,999,077 | 4/1935 | Benedetto. | |
| 3,205,757 | 9/1965 | Kuennen | 24—150 X |

FOREIGN PATENTS

| 73,334 | 4/1917 | Austria. |
|---|---|---|
| 1,323 | 1899 | Great Britain. |

WILLIAM FELDMAN, *Primary Examiner.*

DONALD A. GRIFFIN, *Examiner.*